United States Patent
Park

(10) Patent No.: US 10,303,394 B2
(45) Date of Patent: May 28, 2019

(54) MEMORY SYSTEM AND OPERATING METHOD THEREOF

(71) Applicant: SK hynix Inc., Gyeonggi-do (KR)

(72) Inventor: Chang-Hyun Park, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/709,697

(22) Filed: Sep. 20, 2017

(65) Prior Publication Data

US 2018/0232177 A1    Aug. 16, 2018

(30) Foreign Application Priority Data

Feb. 15, 2017 (KR) ........................ 10-2017-0020641

(51) Int. Cl.
*G06F 5/00* (2006.01)
*G06F 3/06* (2006.01)

(52) U.S. Cl.
CPC ............ *G06F 3/0649* (2013.01); *G06F 3/064* (2013.01); *G06F 3/0616* (2013.01); *G06F 3/0679* (2013.01); *G06F 3/0688* (2013.01)

(58) Field of Classification Search
CPC ..... G06F 3/0649; G06F 3/0616; G06F 3/0679
USPC .................................................. 365/185.11
See application file for complete search history.

(56) References Cited

U.S. PATENT DOCUMENTS

| 6,081,447 | A * | 6/2000 | Lofgren | G11C 8/12 365/185.02 |
| 6,134,634 | A * | 10/2000 | Marshall, Jr. | G06F 12/0804 711/141 |
| 7,113,432 | B2 * | 9/2006 | Mokhlesi | G11C 16/06 365/185.11 |
| 7,397,707 | B2 * | 7/2008 | Mokhlesi | G11C 16/06 365/185.11 |
| 9,298,606 | B2 | 3/2016 | Ramanujan | |
| 2004/0228197 | A1 * | 11/2004 | Mokhlesi | G11C 16/06 365/232 |
| 2006/0265526 | A1 * | 11/2006 | Holbrook | H04L 49/90 710/52 |
| 2007/0070692 | A1 * | 3/2007 | Mokhlesi | G11C 16/06 365/185.08 |
| 2013/0282967 | A1 * | 10/2013 | Ramanujan | G11C 16/06 711/103 |
| 2015/0347038 | A1 | 12/2015 | Monteleone et al. | |

FOREIGN PATENT DOCUMENTS

KR       101380602       4/2014

* cited by examiner

*Primary Examiner* — Xiaochun L Chen
(74) *Attorney, Agent, or Firm* — IP & T Group LLP

(57) ABSTRACT

A memory system may include: a memory device having a plurality of blocks; and a controller suitable for performing a count operation on each of the blocks in response to a preset number of write requests, and performing a wear leveling operation based on the result of the count operation on each of the blocks.

19 Claims, 14 Drawing Sheets

MEMORY SYSTEM AND OPERATING METHOD THEREOF

CROSS-REFERENCE TO RELATED APPLICATIONS

The present application claims priority of Korean Patent Application No. 10-2017-0020641, filed on Feb. 15, 2017, which is herein incorporated by reference in its entirety.

BACKGROUND

1. Field

Various embodiments relate to a memory system and an operating method thereof.

2. Description of the Related Art

Recently, the paradigm of the computer environment has changed into a ubiquitous computing environment which allows users to gain access to a computer system anywhere at anytime. For this reason, the use of portable electronic devices, such as mobile phones, digital cameras, laptop computers and the like, is surging. The portable electronic devices generally employ a memory system using a memory device for storing data. A memory system may be used as a main memory device or an auxiliary memory device of a portable electronic device.

A memory device has excellent stability and durability because it does not include a mechanical driving unit. Also, the memory device is advantageous in that it may access data quickly and consume a small amount of power. Non-limiting examples of a memory device having these advantages include a universal serial bus (USB) memory device, a memory card with diverse interfaces, and a solid-state drive (SSD). Another example of the data storage device may include a persistent memory such as non-volatile dual-in line memory module (NVDIMM). Since the persistent memory has a limited write count, the persistent memory requires a wear leveling technique capable of increasing its lifetime while improving its endurance.

SUMMARY

Various embodiments are directed to a memory controller capable of performing a wear leveling operation, a memory system and an operating method thereof.

In an embodiment, a memory system may include: a memory device including a plurality of blocks; and a controller suitable for performing a count operation on each of the blocks in response to a preset number of write requests, and performing a wear leveling operation based on the result of the count operation on each of the blocks.

In an embodiment, a memory controller may include: a memory element including a mapping table for at least one of a read operation and a write operation on a memory device including a plurality of blocks, and suitable for storing a count value as metadata, the count value being based on a result of a write count operation on each of the blocks; a processing block; and a control unit suitable for determining pages that need to be swapped. The processing block may perform the write count operation on each of the blocks in response to a preset number of write requests, and perform a wear leveling operation by swapping the pages determined by the control unit based on the result of the write count operation on each of the blocks.

In an embodiment, there is provided an operating method for a memory system which includes a memory device including a plurality of blocks; and a controller including a memory element, a processing block and a control unit. The operating method may include: performing a write count operation on each of the blocks included in the memory device in response to a preset number of write requests; and performing a wear leveling operation based on the result of the write count operation on each of the blocks.

BRIEF DESCRIPTION OF THE DRAWINGS

The above and other features and advantages of the present invention will become more apparent to those skilled in the art to which the present invention pertains by the following detailed description with reference to the attached drawings in which.

DETAILED DESCRIPTION

Figure 1:
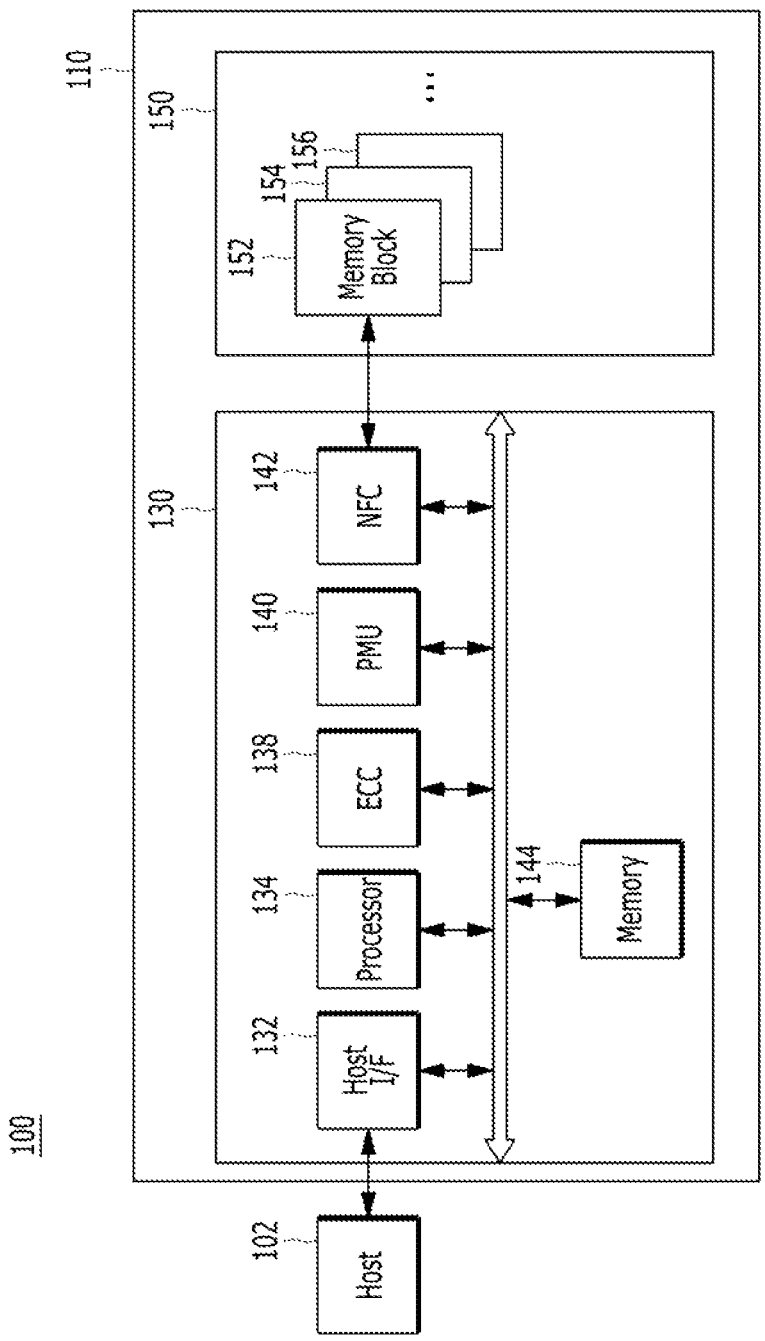
FIG. 1 is a block diagram illustrating a data processing system including a memory system in accordance with an embodiment of the present disclosure.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, the various embodiments of the present invention will be described in detail with reference to the attached drawings.

FIG. 1 is a block diagram illustrating a data processing system 100 including a memory system 110 in accordance with an embodiment of the present disclosure.

Referring to FIG. 1, the data processing system 100 may include a host 102 operatively coupled to the memory system 110.

The host 102 may be any suitable electronic device including portable electronic devices such as a mobile phone, MP3 player and laptop computer or non-portable electronic devices such as a desktop computer, game machine, TV and projector.

The host 102 may include at least one operating system (OS), and the OS may manage and control the overall functions and operations of the host 102, and also provide an operation between the host 102 and a user using the data processing system 100 or the memory system 110. The OS may support functions and operations corresponding to the use, purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include one or more of OS's. The host 102 may execute an OS to perform an operation corresponding to a user's request on the memory system 110.

The memory system 110 may operate to store data for the host 102 in response to a request of the host 102. Non-limited examples of the memory system 110 may include a solid state drive (SSD), a multi-media card (MMC), a secure digital (SD) card, universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Non-limited examples of storage devices included in the memory system 110 may include volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control the read, write, program and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-e), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. That is, the ECC unit 138 may perform an error correction decoding process to the data read from the memory device 150 through an ECC code used during an ECC encoding process. According to a result of the error correction decoding process, the ECC unit 138 may output a signal, for example, an error correction success/fall signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 when the memory device is a NAND flash memory, such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface for example, a NAND flash interface, for processing a command and data between the controller 130 and the memory device 150. Specifically, the NFC 142 may support data transfer between the controller 130 and the memory device 150. Other memory/storage interfaces may be used when a different type memory device is employed.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, and may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
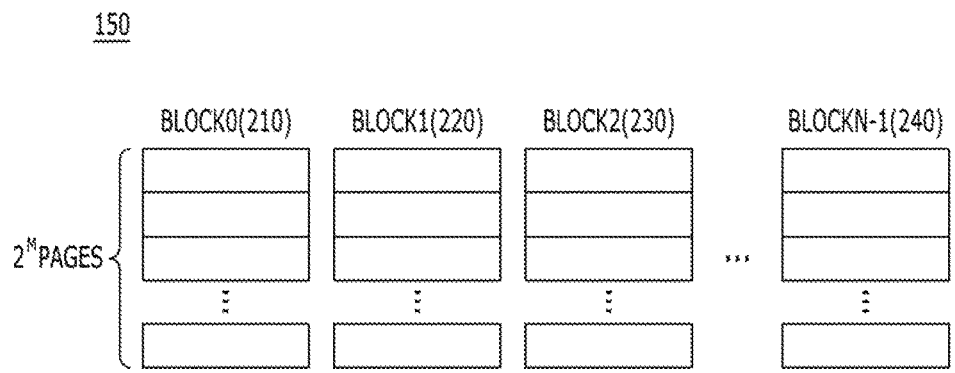
FIG. 2 is a schematic diagram illustrating an exemplary configuration of a memory device employed in the memory system of FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, a multi-level cell (MLC) storing 2-bit data, an MLC storing 3-bit data also referred to as a triple level cell (TLC), an MLC storing 4-bit data also referred to as a quadruple level cell (QLC), or an MLC storing 5-bit or more bit data.

Figure 3:
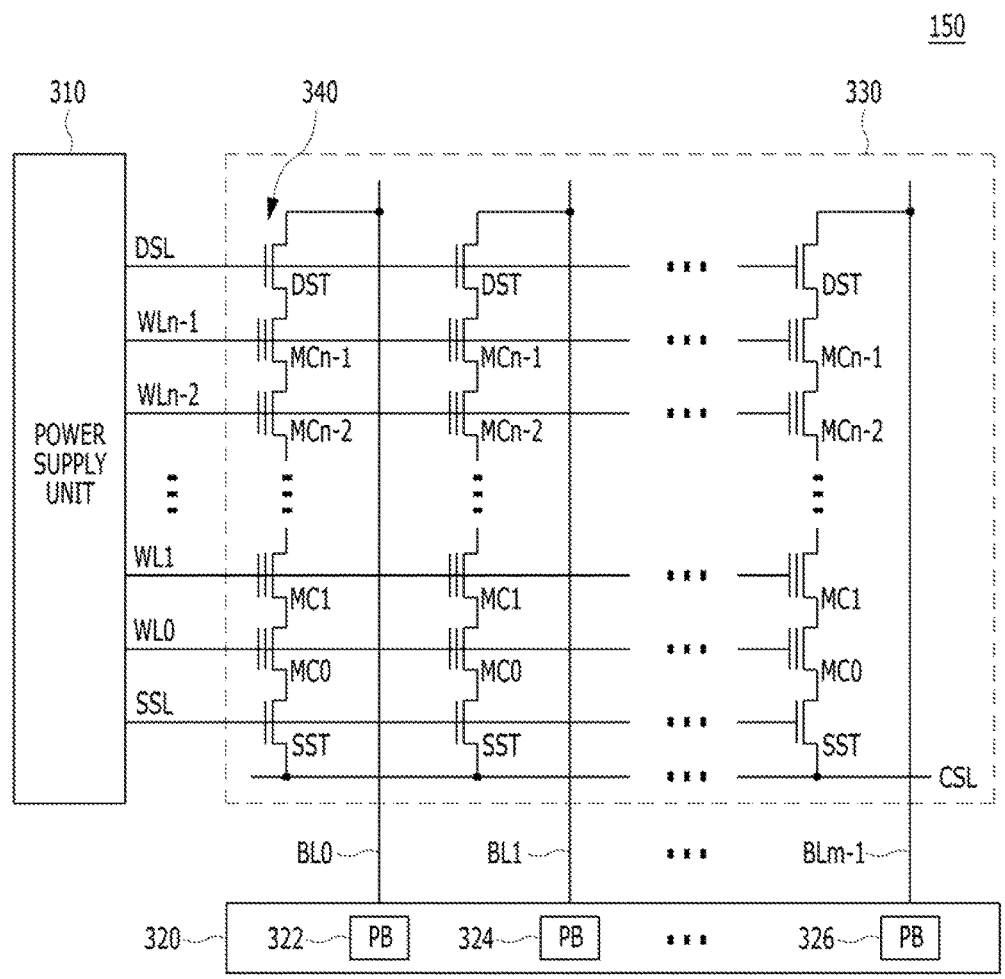
FIG. 3 is a circuit diagram illustrating an exemplary configuration of a memory cell array of a memory block in the memory device of FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. For example, it is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks or sectors of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns or bit lines, or column pairs or bit line pairs, and each of the page buffers 322 to 326 may include a plurality of latches (not illustrated).

Figure 4:
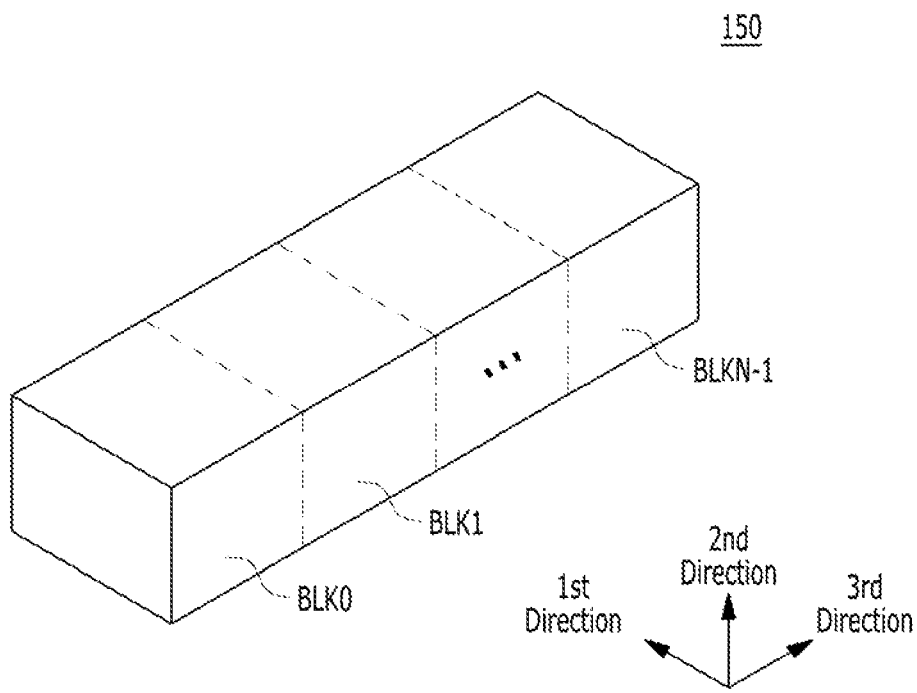
FIG. 4 is a schematic diagram illustrating an exemplary three-dimensional structure of the memory device of FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure or vertical structure.

Figure 5:
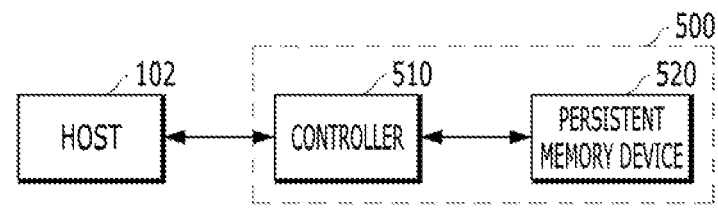
FIG. 5 is a block diagram illustrating a memory system including a persistent memory device in accordance with an embodiment of the present disclosure.

FIG. 5 is a block diagram illustrating a memory system 500 including a persistent memory device 520 in accordance with an embodiment of the present disclosure.

Referring to FIG. 5, the memory system 500 may be coupled to a host 102, and include a controller 510 and the persistent memory device 520. The controller 510 and the persistent memory device 520 may correspond to the controller 130 and the memory device 150, respectively, which are illustrated in FIG. 1. The persistent memory device 520 may be byte addressable, and have a structure in which a volatile memory and a nonvolatile memory are coupled to each other, such as non-volatile dual-in line memory module (NVDIMM). Since the persistent memory device 520 has a limited write count, the persistent memory device 520 may require a wear leveling technique capable of increasing its lifetime while improving its endurance.

In general, the persistent memory device is byte addressable, and has very high read/write latency. In order to guarantee such a property, research has been mainly conducted on an algebraic method or statistical method as a wear leveling method for the persistent memory device. Such methods consider that the wear leveling technique is implemented only by hardware (H/W) logic, in order to guarantee low latency of the persistent memory device. However, the wear leveling technique based on the algebraic method or statistical method generally exhibits lower efficiency and performance than a static wear leveling technique which is implemented in a software (S/W) manner.

Various embodiments provide a technique which is capable of performing a part of a wear leveling operation in a software manner, while guaranteeing high read/write latency based on relatively high write endurance of the persistent memory. The embodiments can be applied to all wear leveling methods based on a write count.

Figure 6:
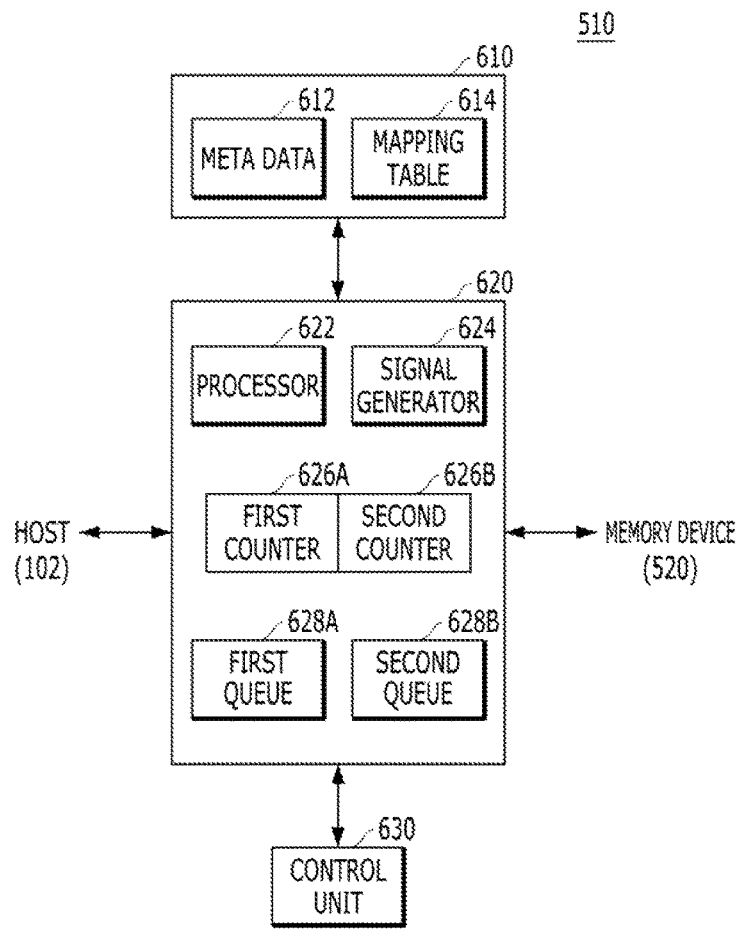
FIG. 6 is a block diagram illustrating a memory controller in accordance with an embodiment of the present disclosure.

FIG. 6 is a block diagram illustrating a memory controller in accordance with an embodiment of the present disclosure. For example, the memory controller of FIG. 6 may serve as the controller 510 which is coupled between the host 102 and the persistent memory device 520 as illustrated in FIG. 5. FIG. 5 exemplifies that the controller 510 is coupled to the persistent memory device 520. However, the wear leveling operation in accordance with the present embodiments can be applied to all wear leveling methods based on a write count. For example, the wear leveling operation in accordance with the present embodiments can be applied to all memory devices including a NAND-type flash memory.

Referring to FIG. 6, the memory controller 510 may include a memory element 610, a processing block 620 and a control unit 630.

The memory element 610 may include metadata 612 and a mapping table 614. In various embodiments, the memory element 610 may include dynamic random access memory (DRAM). The mapping table 614 may store the mapping relation between a physical address of the memory device 520 and a logical address for the memory region, which may be received with a read/write request or command from the host 102 during a read/write operation for the memory device 520 including a plurality of storage regions, for example, blocks. In various embodiments, the mapping table 614 may be implemented for a memory device based on 4 KB blocks. The metadata 612 may include information on each of the storage regions included in the memory device 520. In various embodiments, the metadata 612 may include a count value based on a result obtained by performing a write count operation on each of the 4 KB blocks.

The processing block 620 may receive a request from the host 102, and process the received request on the memory device 520. In various embodiments, the processing block 620 may perform a wear leveling operation while performing an operation according to a read or write request for the memory device 520, which may be received from the host 102. That is, the processing block 620 may perform a write count operation in response to a preset number of write requests for each of the blocks included in the memory device 520, and perform a wear leveling operation based on the result of the write count operation for each of the blocks. The processing block 620 may be mainly implemented by hardware components in order to guarantee high latency of the memory device 520.

The processing block 620 may include a processor 622, a signal generator 624, a first counter 626A, a second counter 626B, a first queue 628A and a second queue 628B.

The processor 622 may perform a read or write operation according to a read or write request for the memory device 520, which may be received from the host 102. That is, when the read/write request is received from the host 102, the processor 622 may decide a position of the memory device 520, that is, where the read/write operation is to be performed, by referring to the mapping table 614 of the memory element 610. Furthermore, the processor 622 may perform a swap operation on blocks which need to be swapped, by referring to a search result of the second queue 628B. In various embodiments, the processor 622 may perform a swap operation after holding a read/write operation.

The first counter 626A may perform a count operation in response to the received write request. In various embodiments, a write operation within a block included in the memory device 520 may be performed in various units of 64B, 256B and 512B, and the first counter 626A may perform a count operation whenever a write is requested. The second counter 626B may perform a count operation whenever the first counter 626A completes a predetermined number of count operations for example, 64, 256 or 512. The counters 626A and 626B may be implemented with an up counter or down counter. When the first counter 626A is implemented with an up counter, an overflow may occur or be caused by the first counter 626A whenever the predetermined number of count operations is completed. In this case, the second counter 626B may perform a count operation in response to the overflow which occurred by the first counter 626A. For example, the first counter 626A may perform a count operation whenever a write is requested, and the second counter 626B may perform a count operation whenever the first counter 626A completes the predetermined number of count operations for example, 512 count operations. As a result, the second counter 626B may perform a count operation in response to 512 write requests. Hereafter, the example in which the first and second counters 626A and 626B are implemented with up counters and an overflow occurs when the first counter 626A completes a preset number of count operations, will be described as follows.

The first queue 628A may store information on pages where a preset number of count operations were performed by the second counter 626B, among the plurality of blocks included in the memory device 520. For example, the information may include addresses. In various embodiments, the first queue 628A may be implemented with a circular queue.

The second queue 628B may store information on pages which need to be swapped for a wear leveling operation, among the plurality of blocks included in the memory device 520. For example, the information may include addresses of page pairs. The signal generator 624 may generate a signal indicating that the first queue 628A was updated, for example, an interrupt signal.

The control unit 630 may perform an operation of checking blocks which need to be swapped. That is, the control unit 630 may search the first queue 628A and the memory element 610 to check pages which need to be swapped for a wear leveling operation, and store information on the checked pages in the second queue 628B, in response to a signal received from the processing block 620 and indicating that the first queue 628A was updated.

Figure 11:
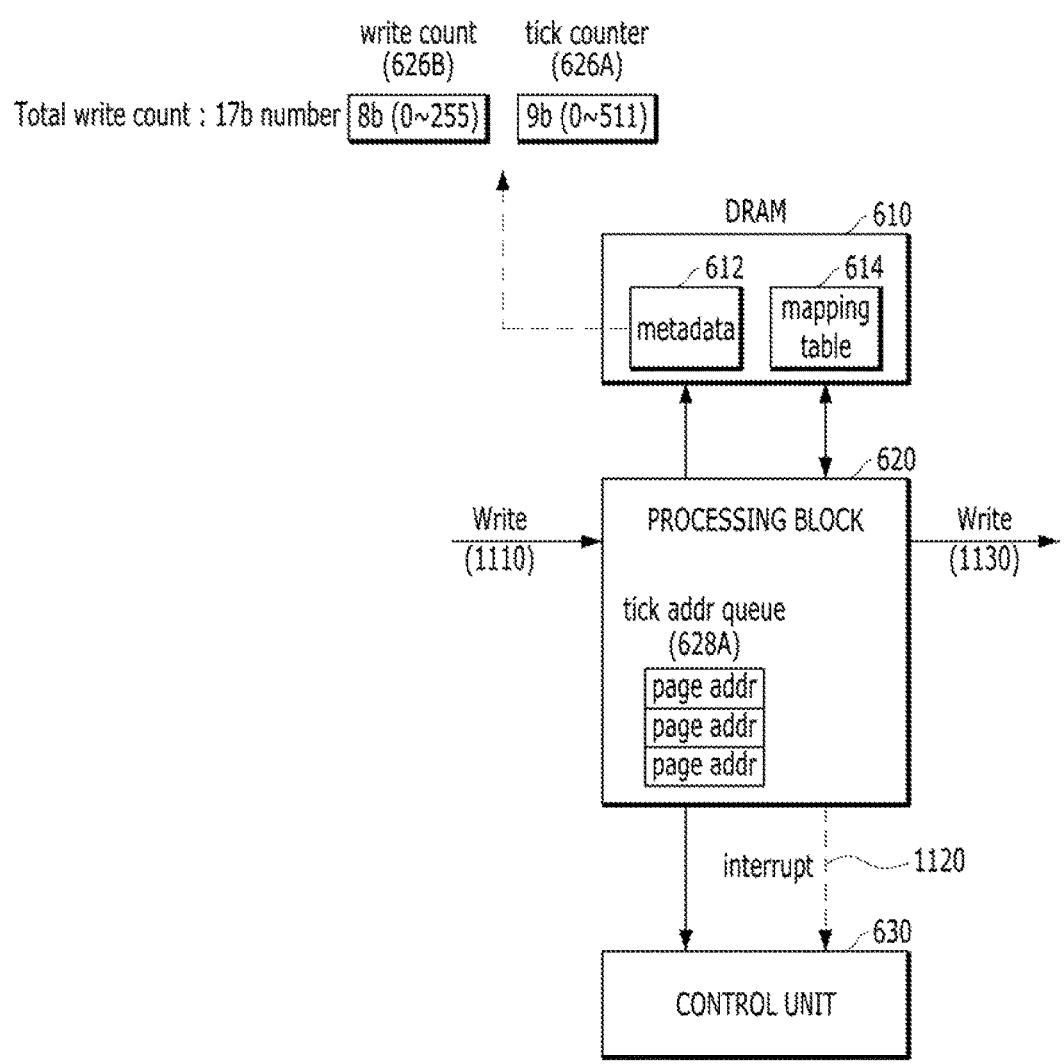
FIG. 11 is a diagram illustrating an example of a write count operation which is performed by a memory controller in accordance with an embodiment of the present disclosure.

In accordance with the present embodiment, the processing block 620 may perform a write count operation using the two separated counters 626A and 626B. That is, whenever the first counter 626A completes the preset number of count operations, the second counter 626B may perform a write count operation. In various embodiments, the counters 626A and 626B may be implemented with up counters. In this case, the write count value by the second counter 626B may be updated whenever an overflow occurs as the first counter 626A completes the preset number of count operations. For example, as illustrated in FIG. 11, the first counter 626A may serve as a 9-bit counter to perform a 512-count operation, and the second counter 626B may serve as an 8-bit counter to perform a 256-count operation. The first counter 626A may perform the 512-count operation or count from 0 to 511, and the second counter 626B may perform the 256-count operation or count from 0 to 255. In this case, the first counter 626A may perform a count operation whenever a write is requested, and the second counter 626B may perform a count operation whenever the first counter 626A completes 512 count operations. As a result, the second counter 626B may perform a count operation in response to 512 write requests.

The signal generator 624 of the processing block 620 may generate an interrupt signal when an overflow of the first counter 626A occurs during a write operation, and transmit the interrupt signal to the control unit 630. The interrupt signal may indicate that there is a block of which the write count value was increased, and the control unit 630 receiving the interrupt signal may recognize that there is a block of which the write count value was increased.

The first queue 628A may store addresses for a block in which an overflow was caused by the first counter 626A. The control unit 630 may recognize blocks of which the write count values were increased, based on the information stored in the first queue 628A.

The control unit 630 may recognize the addresses of the blocks of which the write count values were increased, and perform various wear leveling algorithms. The control unit 630 may directly access the memory element 610 in order to check the write count values of the respective blocks.

The second queue 628B may store addresses indicating blocks to be swapped. The control unit 630 may perform the wear leveling algorithm, decide blocks which are to be swapped at an appropriate time, and store the addresses of the blocks in the second queue 628B. When the swap information of the second queue 628B is updated, the processing block 620 may temporarily hold a read/write operation at an appropriate time, and perform a page swap operation. Since the swap operation for wear leveling is publicly known and may be implemented in various manners, the detailed descriptions thereof are omitted herein. While the read/write operation is performed by the processing block 620, the software wear leveling operation may be performed by the control unit 630. That is, the memory system 500 in accordance with the present embodiments may have an architecture in which a wear leveling operation is performed in parallel to a read/write path.

Figure 7:
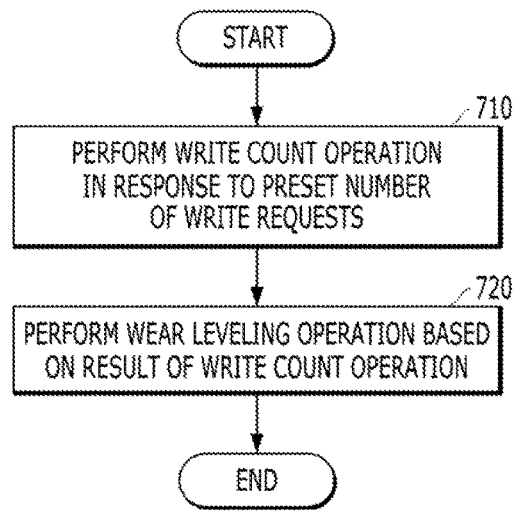
FIG. 7 is a flowchart illustrating a wear leveling operation of a memory system including a persistent memory device in accordance with an embodiment of the present disclosure.

FIG. 7 is a flowchart illustrating a wear leveling operation of a memory system including a persistent memory device in accordance with an embodiment of the present disclosure. The flow of FIG. 7 may be performed by the controller 510 illustrated in FIG. 6.

Referring to FIG. 7, the controller 510 may perform a write count operation in response to the preset number of write requests at step 710. At step 720, the controller 510 may perform a wear leveling operation based on the result of the write count operation.

Figure 8:
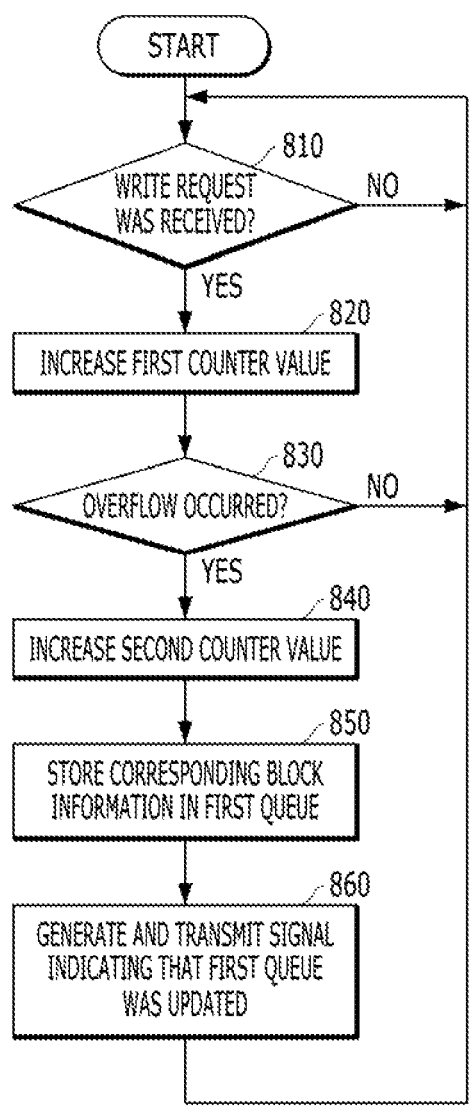
FIG. 8 is a flowchart illustrating a write count operation which is performed by a processing block in accordance with an embodiment of the present disclosure

FIG. 8 is a flowchart illustrating a write count operation in accordance with an embodiment of the present disclosure. The flow of FIG. 8 may be performed by the processing block 620 illustrated in FIG. 6.

Referring to FIG. 8, the processing block 620 may check whether a write request was received, at step 810. When checking that the write request was received, the processing block 620 may increase the count value of the first counter 626A at step 820.

At step 830, the processing block 620 may check whether an overflow occurred by the first counter 626A. When checking that an overflow occurred by the first counter 626A, the processing block 620 may increase the count value of the second counter 626B at step 840. At step 850, the processing block 620 may store the corresponding block information indicating that the count value of the second counter 626B was increased, in the first queue 628A.

At step 860, the processing block 620 may generate an indication signal indicating that the first queue 628A was updated, and transmit the indication signal to the control unit 630.

Figure 9:
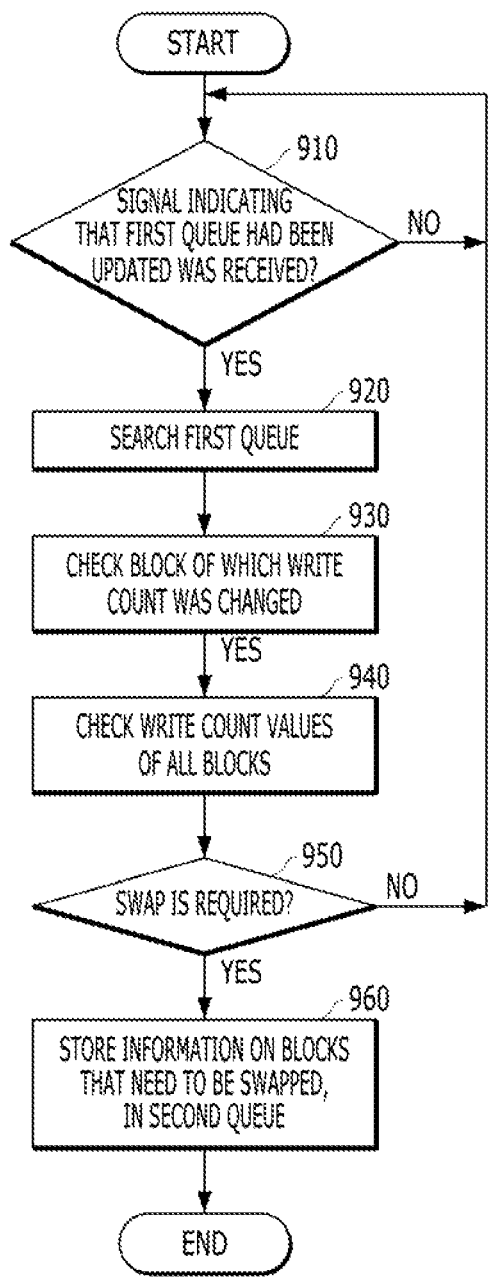
FIG. 9 is a flowchart illustrating a swap information storage operation which is performed by a control unit in accordance with an embodiment of the present disclosure.

FIG. 9 is a flowchart illustrating a swap information storage operation in accordance with an embodiment of the present disclosure. The flow of FIG. 9 may be performed by the control unit 630 illustrated in FIG. 6.

Referring to FIG. 9, the control unit 630 may check whether a signal indicating that the first queue 628A had been updated was received, at step 910. When checking that the signal indicating that the first queue 628A had been updated was received, the control unit 630 may search the first queue 628A at step 920, and check a block of which the write count value was changed at step 930. Then, the control unit 630 may search the memory element 610 to check the write count values of all blocks at step 940.

Depending on the check result for the write count values of all blocks, the control unit 630 may check whether a swap operation is required, at step 950. Since the operation of checking whether a swap operation is required can be performed in various manners according to a publicly known wear leveling operation, the detailed descriptions thereof are omitted herein. When checking that a swapping operation is required, the control unit 630 may store information on blocks which need to be swapped, in the second queue 628B at step 960.

Figure 10:
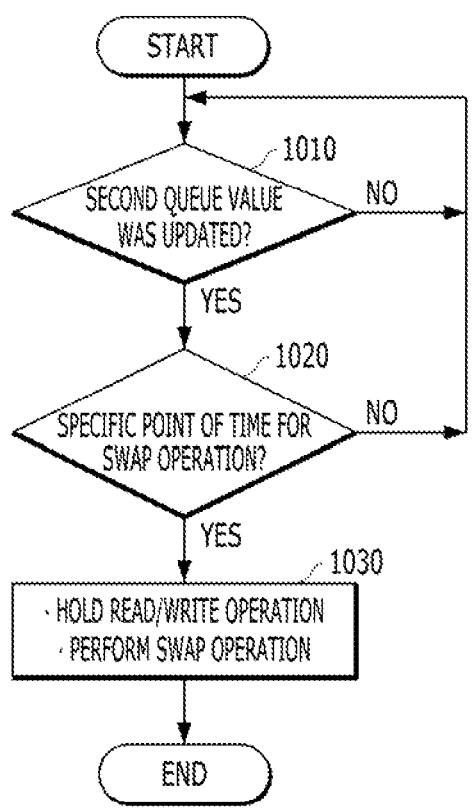
FIG. 10 is a flowchart illustrating a swap operation which is performed by a processing block in accordance with an embodiment of the present disclosure.

FIG. 10 is a flowchart illustrating a swap operation in accordance with an embodiment of the present disclosure. The flow of FIG. 10 may be performed by the processing block 620 illustrated in FIG. 6.

Referring to FIG. 10, the processing block 620 may check whether the value of the second queue 628B was updated, at step 1010. When checking that the value of the second queue 28B was updated, the processing block 620 may check whether it is a specific point of time for a swap operation, at step 1020. Since the operation of checking whether it is a specific point of time for a swap operation can be performed in various manners according to a publicly known wear leveling operation, the detailed descriptions thereof are omitted herein. When checking that it is a specific point of time for a swap operation, the processing block 620 may hold a read/write operation and perform the swap operation, at step 1030.

FIG. 11 is a diagram illustrating an example of a write count operation which is performed by a memory controller in accordance with an embodiment of the present disclosure. The flow of FIG. 11 may be performed by the controller 510 illustrated in FIG. 6.

Referring to FIG. 11, the processing block 620 may decide a location of the memory device 520, where a read/write operation is to be performed, by referring to the mapping table 614 in the memory element 610 for example, DRAM during the read/write operation (operation 1110/1130).

During the write operation, the processing block 620 may increase the first counter 626A for example, the tick counter. The write operation for each of the blocks included in the memory device 520, for example, 4 KB blocks may be performed in various units of 64B, 256B and 512B.

The processing block 620 may control the first counter 626A to perform a count operation whenever a write request is generated. For example, whenever a write request is requested, the tick counter 626A may increase the count value.

When an overflow occurs after the first counter 626A was increased, the processing block 620 may increase the write count value of the second counter 626B by 1, and store information on the corresponding address in a tick address queue as the first queue 628A. The processing block 620 may generate an interrupt signal, and transmit the generated interrupt signal to the control unit 630 in order to inform the control unit 630 that the first queue 628A was updated (operation 1120).

For example, the first counter 626A may operate as a 9-bit counter, and the second counter 626B may operate as an 8-bit counter. The first counter 626A may perform a 512-count operation or count from 0 to 511, and the second counter 626B may perform a 256-count operation or count from 0 to 255. That is, the combination of the first counter 626A and the second counter 626B may operate as a 17-bit counter. In this case, the first counter 626A may perform a count operation whenever a write is requested, and the second counter 626B may perform a count operation whenever the first counter 626A completes 512 count operations. As a result, the second counter 626B may perform a count operation in response to 512 write requests.

Figure 12:
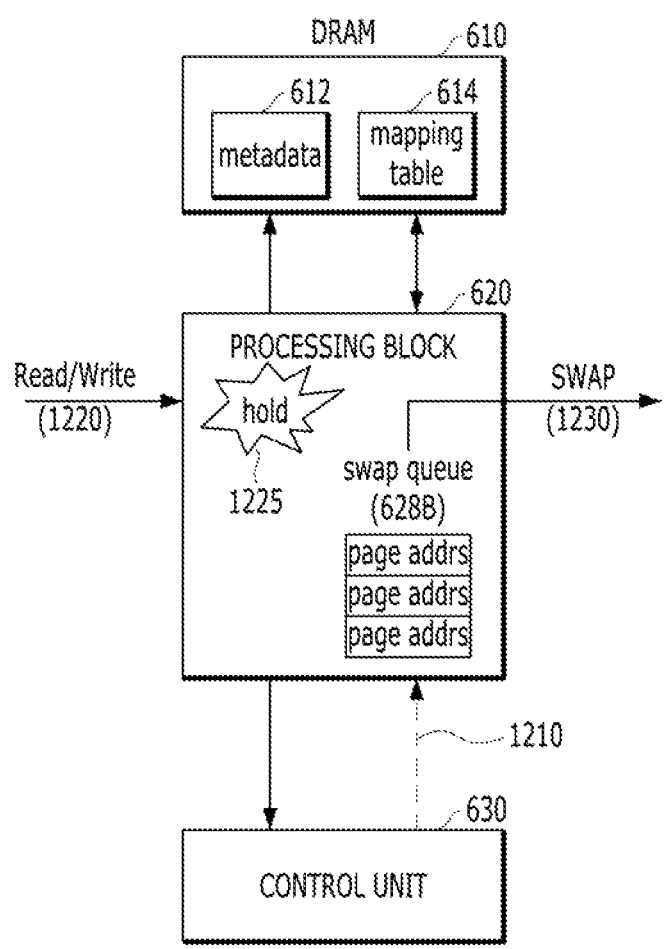
FIG. 12 is a diagram illustrating an example of a swap operation which is performed by a memory controller in accordance with an embodiment of the present disclosure.

FIG. 12 is a diagram illustrating an example of a swap operation which is performed by a memory controller in accordance with an embodiment of the present disclosure. The flow of FIG. 12 may be performed by the controller 510 illustrated in FIG. 6.

Referring to FIG. 12, the control unit 630 may recognize that there is a block of which the write count value was changed by an interrupt for example, 1120 of FIG. 11, and recognize the block of which the write count value was changed, by referring to the information of the tick addr queue 628A.

The control unit 630 may recognize the block of which the write count value was changed, and directly access the memory element for example, DRAM 610 to refer to the write count values of all physical blocks. Therefore, the embodiments may be applied to any wear leveling algorithms based on a write count.

The control unit 630 may perform a wear leveling algorithm which is not specified, and decide which blocks to swap at a specific point of time. In the various embodiments, although the write count value was changed, a swap target is not necessarily decided at each time. According to the result of the wear leveling algorithm which is not specified, the control unit 630 may decide whether to perform a swap operation, and the point of time to perform the swap operation may be decided by the algorithm in the control unit 630.

When the control unit 630 recognizes that a swap operation is required, the control unit 630 may store information on the pages of the blocks which need to be swapped, in a swap queue serving as the second queue 628B (operation 1210). For example, the information may include the addresses of page pairs.

When the value of the second queue 628B is updated, the processing block 620 may temporarily hold a read/write operation which is being performed at a specific point of time (operations 1220 and 1225), and perform a block swap operation (operation 1230). In various embodiments, a point of time to perform the block swap operation may be decided according to the traffic in the processing block 620 or the number of items in the second queue 628B.

The present embodiments propose a software wear leveling method which is suitable for being used in a system including a persistent memory device which has low write latency and high write endurance. Without performing a wear leveling algorithm at each write, the memory system may perform the wear leveling algorithm whenever a preset number of write requests for example, every 512 or 1024 are received, based on the characteristic that the persistent memory has a long lifetime, thereby securing a performance time in which the software algorithm may be performed by the control unit. In order to guarantee low latency of the persistent memory, the control unit may not be involved in a read/write operation, but receive only update information of the write counter. Therefore, since the read/write path and the wear leveling operation path are separated to perform operations in parallel, the performance time of the software algorithm can be further secured. The present embodiments can implement a software wear leveling method suitable for the persistent memory. Such a wear leveling method may be applied to not only a memory system including a persistent memory, but also any memory systems that perform a wear leveling operation based on a write count value.

Hereinafter, a data processing system and electronic equipment provided with the memory system 110 including the memory device 150 and the controller 130 described with reference to FIGS. 1 to 12 in accordance with an embodiment will be described in more detail with reference to FIGS. 13 to 21.

FIGS. 13 to 21 are diagrams schematically illustrating application examples of the data processing system of FIG. 1.

Figure 13:
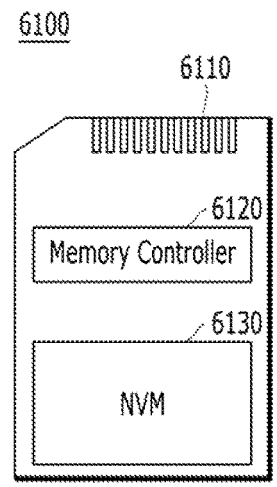
FIGS. 13 to 21 are diagrams schematically illustrating application examples of the data processing system of FIG. 1 in accordance with various embodiments of the present disclosure.

FIG. 13 is a diagram schematically illustrating another example of the data processing system including the memory system in accordance with an embodiment of the present disclosure. FIG. 13 schematically illustrates a memory card system to which the memory system in accordance with an embodiment is applied.

Referring to FIG. 13, the memory card system 6100 may include a connector 6110, a memory controller 6120, and a memory device 6130.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a random access memory (RAM), a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (WI-FI) and Bluetooth. Thus, the memory system and the data processing system in accordance with an embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state drive (SSD) by being integrated into a single semiconductor device. Also, the memory controller 6120 and the memory device 6130 may construct a memory card such as a PC card (e.g., Personal Computer Memory Card International Association (PCM-CIA)), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 14:
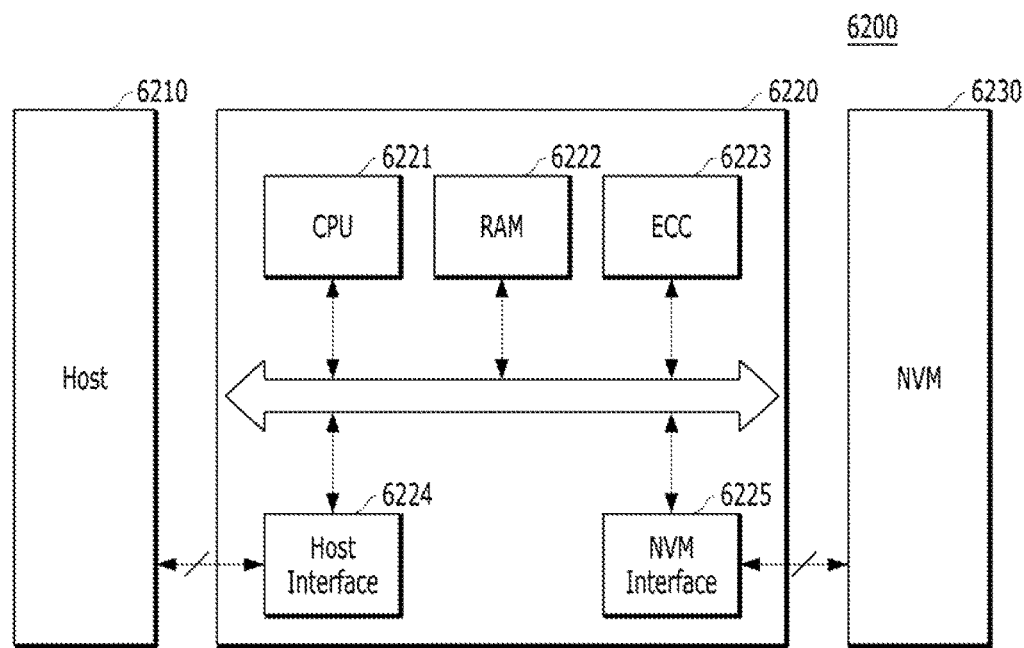

FIG. 14 is a diagram schematically illustrating another example of the data processing system including the memory system in accordance with an embodiment of the present disclosure.

Referring to FIG. 14, the data processing system 6200 may include a memory device 6230 having one or more nonvolatile memories (NVMs) and a memory controller 6220 for controlling the memory device 6230. The data processing system 6200 illustrated in FIG. 14 may serve as a storage medium such as a memory card (e.g., CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include a central processing unit (CPU) 6221, a random access memory (RAM) as a buffer memory 6222, an error correction code (ECC) circuit 6223, a host interface 6224 and an NVM interface as a memory interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an error correction code for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using any suitable method including a coded modulation such as a low density parity check (LDPC) code, a Bose-Chaudhuri-Hocquenghem (BCH) code, a turbo code, Reed-Solomon (RS) code, a convolution code, a recursive systematic code (RSC), a trellis-coded modulation (TCM) or a Block coded modulation (BCM).

The memory controller 6220 may transmit/receive data to/from the host 6210 through the host interface 6224, and transmit/receive data to/from the memory device 6230 through the NVM interface 6225. The host interface 6224 may be connected to the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. The memory controller 6220 may have a wireless communication function with a mobile communication protocol such as wireless fidelity (WI-FI) or long term evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with an embodiment may be applied to wired/wireless electronic devices or particularly a mobile electronic device.

Figure 15:
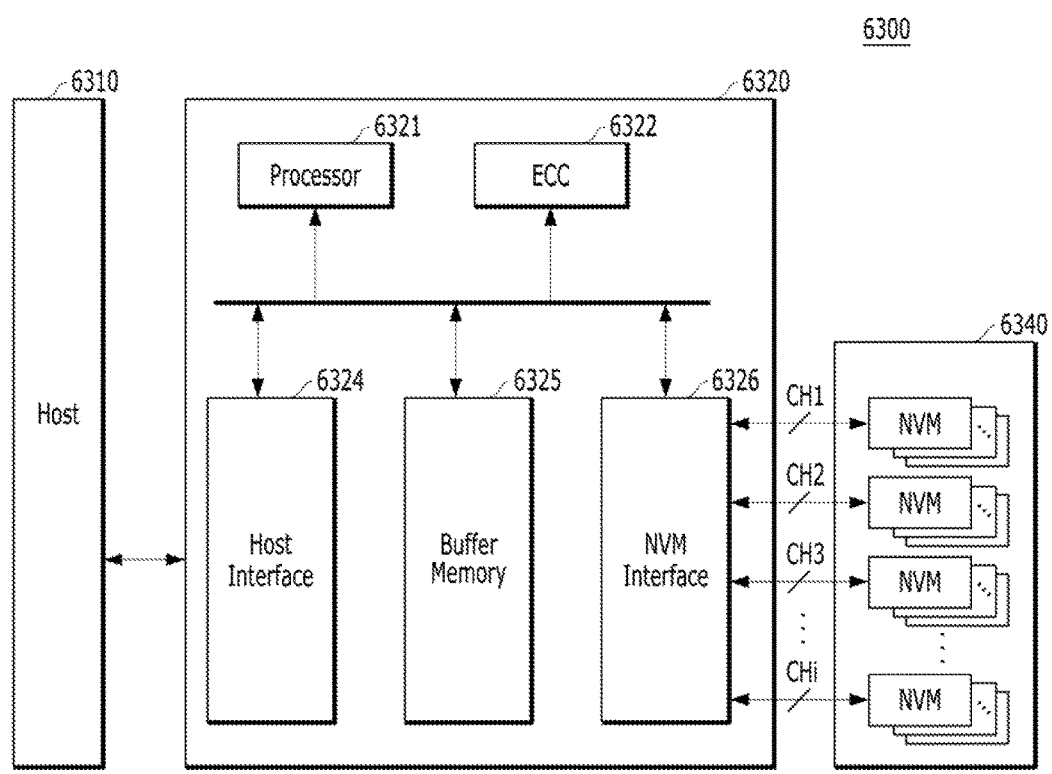

FIG. 15 is a diagram schematically illustrating another example of the data processing system including the memory system in accordance with an embodiment of the present disclosure. FIG. 15 schematically illustrates a solid state drive (SSD) 6300 to which the memory system in accordance with an embodiment is applied.

Referring to FIG. 15, the SSD 6300 may include a controller 6320 and a memory device 6340 including a plurality of nonvolatile memories. The controller 6320 may correspond to the controller 130 in the memory system 110 of FIGS. 1 and 5, and the memory device 6340 may correspond to the memory device 150 in the memory system of FIGS. 1 and 5.

More specifically, the controller 6320 may be connected to the memory device 6340 through a plurality of channels CH1 to CHi. The controller 6320 may include a processor 6321, a buffer memory 6325, an error correction code (ECC) circuit 6322, a host interface 6324 and a nonvolatile memory interface as a memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as a dynamic random access memory (DRAM), a synchronous dynamic random access memory (SDRAM), a double data rate (DDR) SDRAM, a low power double data rate (LPDDR) SDRAM and graphic random access memory (GRAM) or nonvolatile memories such as a ferroelectric random access memory (FRAM), a resistive random access memory (ReRAM), a spin-transfer torque magnetic random access memory (STT-MRAM) and a phase change random access memory (PRAM). For convenience of description, FIG. 10 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, a redundant array of independent disks (RAID) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 16:
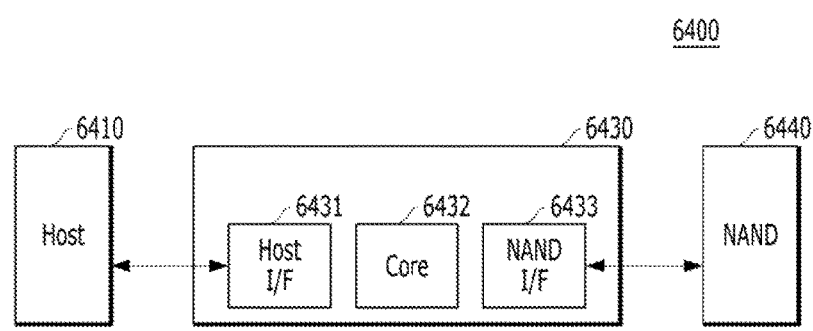

FIG. 16 is a diagram schematically illustrating another example of the data processing system including the memory system in accordance with an embodiment of the present disclosure. FIG. 16 schematically illustrates an embedded Multi-Media Card (eMMC) to which the memory system in accordance with an embodiment is applied.

Referring to FIG. 16, the eMMC 6400 may include a controller 6430 and a memory device 6440 embodied by one or more NAND flash memories. The controller 6430 may correspond to the controller 130 in the memory system 110 of FIGS. 1 and 5, and the memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface such as an MMC interface as described with reference to FIG. 1. Furthermore, the host interface 6431 may serve as a serial interface such as an ultra-high speed class 1 (UHS-I)/UHS class 2 (UHS-II) and a universal flash storage (UFS) interface.

FIGS. 17 to 20 are diagrams schematically illustrating other examples of the data processing system including the memory system in accordance with embodiments of the present disclosure. FIGS. 17 to 20 schematically illustrate universal flash storage (UFS) systems to which the memory system in accordance with an embodiment is applied.

Referring to FIGS. 17 to 20, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 14 to 16, and the UFS cards 6530, 6630, 6730 and 6830 may be embodied in the form of the memory card system 6100 described with reference to FIG. 13.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI Unified Protocol (UniPro) in Mobile Industry Processor Interface (MIPI). Furthermore, the UFS devices 6520, 6620, 6720 and 6820 and the UFS cards 6530, 6630, 6730 and 6830 may communicate with each other through various protocols other than the UFS protocol, for example, USB flash drives (UFDs), multimedia card (MMC), secure digital (SD), mini-SD, and micro-SD.

Figure 17:
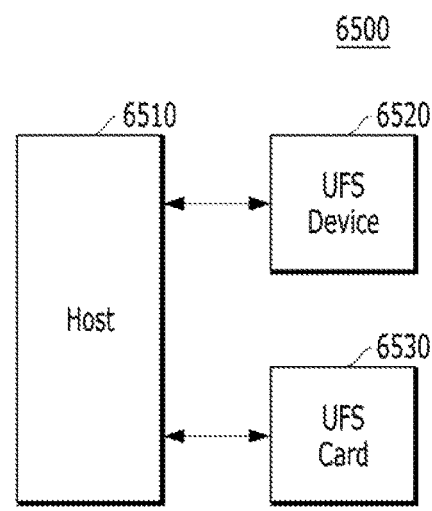

In the UFS system 6500 illustrated in FIG. 17, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In an embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 18:
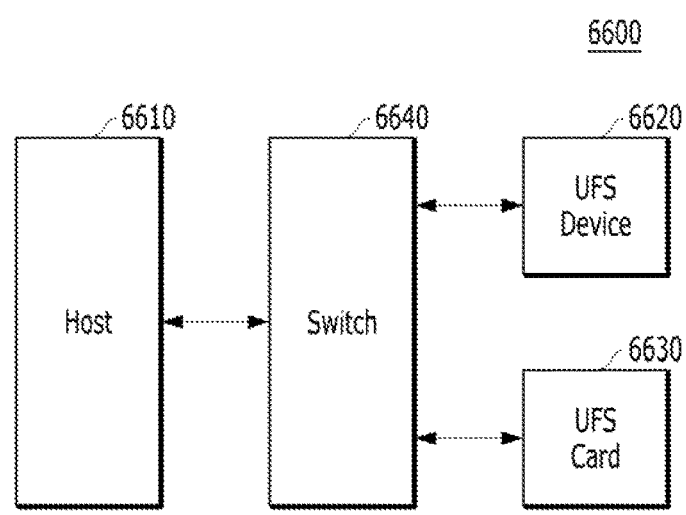

In the UFS system 6600 illustrated in FIG. 18, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 19:
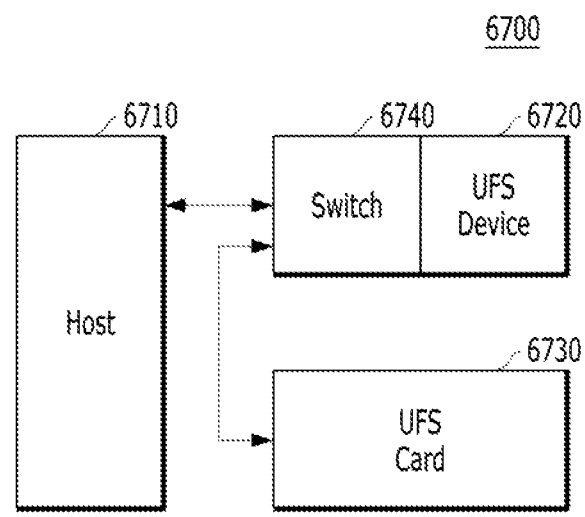

In the UFS system 6700 illustrated in FIG. 19, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 20:
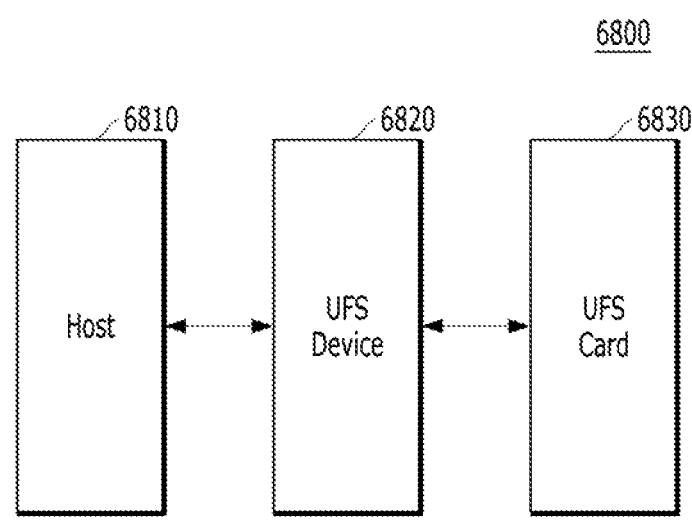

In the UFS system 6800 illustrated in FIG. 20, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target identifier (ID) switching operation. The host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 21:
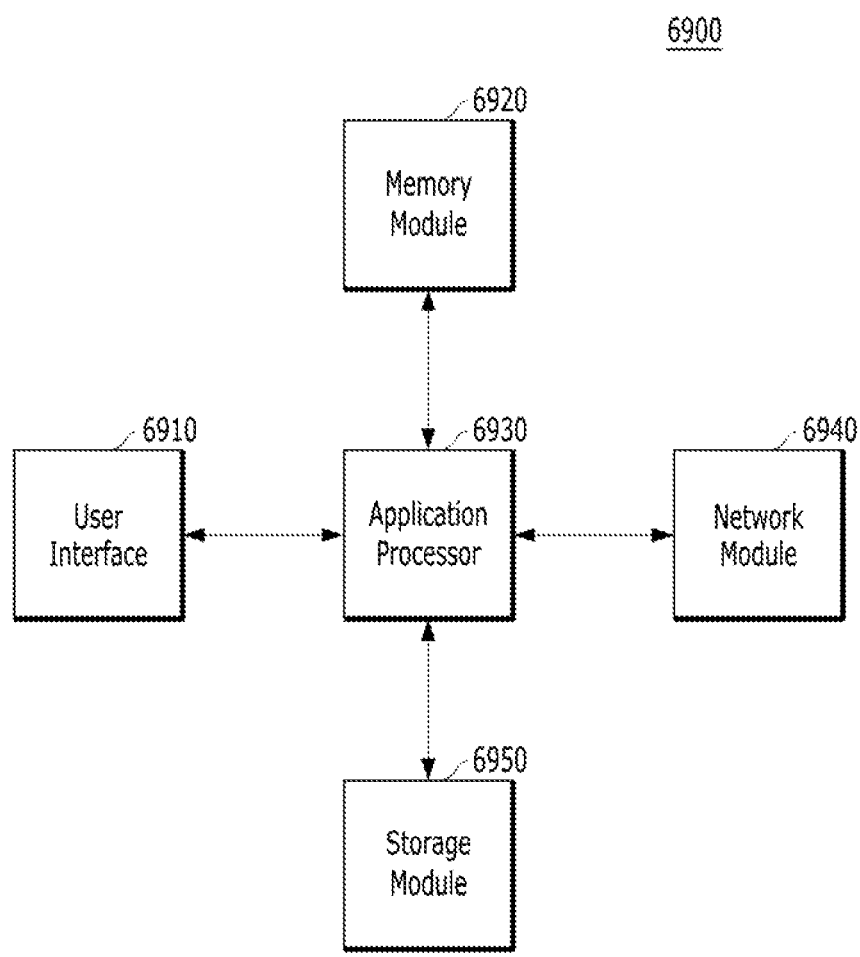

FIG. 21 is a diagram schematically illustrating another example of the data processing system including the memory system in accordance with an embodiment of the present invention. FIG. 21 is a diagram schematically illustrating a user system to which the memory system in accordance with an embodiment is applied.

Referring to FIG. 21, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDARM, an LPDDR2 SDRAM and an LPDDR3 SDRAM or a nonvolatile RAM such as a phase change random access memory (PRAM), a resistive random access memory (ReRAM), a magnetic random access memory (MRAM) and a ferroelectric random access memory (FRAM). For example, the application processor 6930 and the memory module 6920 may be packaged and mounted, based on a package-on-package (POP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WIMAX), wireless local area network (WLAN), ultra-wideband (UWB), Bluetooth, wireless display (WI-DI), thereby communicating with wired and/or wireless electronic devices or particularly mobile electronic devices. Therefore, the memory system and the data processing system, in accordance with an embodiment of the present invention, can be applied to wired and/or wireless electronic devices. The network module 6940 may be included in the application processor 6930.

The storage module 6950 may store data, for example, data provided from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, eMMC and UFS as described above with reference to FIGS. 15 to 20.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the processor 6930 on a display/touch module of the mobile electronic device, or support a function of receiving data from the touch panel.

Although various embodiments have been described for illustrative purposes, it will be apparent to those skilled in the art that various other embodiments, changes and modifications thereof may be made without departing from the spirit and scope of the invention as defined in the following claims.

What is claimed is:

1. A memory system comprising:
a memory device including a plurality of blocks; and
a controller suitable for:
performing a count operation on each of the blocks in response to a preset number of write requests; and
performing a wear leveling operation based on the result of the count operation on each of the blocks,
wherein the controller includes plural structures, each for storing each type of information regarding at least one page, selected based on the result of the count operation, among the plurality of blocks and at least one page, selected to be swapped for the wear leveling operation, among the plurality of blocks.

2. The memory system of claim 1, wherein the controller comprises a memory element, a processing block and a control unit, and
wherein the processing block comprises:
a first counter suitable for performing a count operation on each of the blocks in response to a received write request;
a second counter suitable for performing a count operation whenever a preset number of count operations are completed by the first counter, the preset number of count operations corresponding to the preset number of write requests;
a first queue suitable for storing information on pages where the preset number of count operations were performed, among the plurality of blocks; and
a second queue suitable for storing information on pages that need to be swapped for the wear leveling operation, among the plurality of blocks.

3. The memory system of claim 2, wherein the memory element comprises a mapping table for at least one of a read operation and a write operation on the memory device, and stores a count value as metadata, the count value being based on the result of the count operation on each of the blocks.

4. The memory system of claim 3, wherein the control unit determines the pages that need to be swapped for the wear leveling operation, by searching the first queue and the memory element in response to a signal received from the processing block and indicating that the first queue was updated, and stores information on the checked pages in the second queue.

5. The memory system of claim 3, wherein the processing block comprises:
a signal generator suitable for generating the signal indicating that the first queue was updated; and
a processor suitable for performing the at least one of the read operation and the write operation on the memory device and a swap operation based on the search result of the second queue.

6. The memory system of claim 5, wherein the processor holds the at least one of the read operation and the write operation when performing the swap operation.

7. The memory system of claim 5, wherein the processor performs the swap operation at a predetermined point of time after the information on the checked pages is stored in the second queue.

8. A memory controller comprising:
a memory element including a mapping table for at least one of a read operation and a write operation on a memory device including a plurality of blocks, and suitable for storing a count value as metadata, the count value being based on a result of a write count operation on each of the blocks;
a processing block; and
a control unit suitable for determining pages that need to be swapped,
wherein the processing block performs the write count operation on each of the blocks in response to a preset number of write requests, and performs a wear leveling operation by swapping the pages determined by the control unit based on the result of the write count operation on each of the blocks, and wherein the controller includes plural structures, each for storing each type of information regarding at least one page, selected based on the result of the count operation, among the plurality of blocks and at least one page, selected to be swapped for the wear leveling operation, among the plurality of blocks.

9. The memory controller of claim 8, wherein the processing block comprises:
a first counter suitable for performing a count operation on each of the blocks in response to a received write request;
a second counter suitable for performing a count operation whenever a preset number of count operations are completed by the first counter, the preset number of count operations corresponding to the preset number of write requests;
a first queue suitable for storing information on pages where the preset number of count operations were performed, among the plurality of blocks; and
a second queue suitable for storing information on the pages that need to be swapped for the wear leveling operation, among the plurality of blocks.

10. The memory controller of claim 9, wherein the control unit determines the pages that need to be swapped for the wear leveling operation, by searching the first queue and the memory element in response to a signal received from the processing block and indicating that the first queue was updated, and stores information on the checked pages in the second queue.

11. The memory controller of claim 10, wherein the processing block comprises:
a signal generator suitable for generating the signal indicating that the first queue was updated; and
a processor suitable for performing the at least one of the read operation and the write operation on the memory device and a swap operation based on the search result of the second queue.

12. The memory controller of claim 11, wherein the processor holds the at least one of the read operation and the write operation when performing the swap operation.

13. The memory controller of claim 11, wherein the processor performs the swap operation at a predetermined point of time after the information on the checked pages is stored in the second queue.

14. An operating method for a memory system which comprises a memory device including a plurality of blocks; and a controller including a memory element, a processing block and a control unit, the operating method comprising:
performing a write count operation on each of the blocks included in the memory device in response to a preset number of write requests; and
performing a wear leveling operation based on the result of the write count operation on each of the blocks,
wherein the performing of the write count operation comprises:
performing, by a first counter of the processing block, a count operation on each of the blocks in response to a received write request;
performing, by a second counter of the processing block, a count operation whenever a preset number of count operations are completed by the first counter, the preset number of count operations corresponding to the preset number of write requests; and
storing information on pages where the preset number of count operations were performed, among the plurality of blocks, in a first queue of the processing block.

15. The operating method of claim 14, further comprising storing, by the processing block, information on the pages that need to be swapped for the wear leveling operation among the plurality of blocks, in a second queue of the processing block.

16. The operating method of claim 15, further comprising determining, by the control unit, pages that need to be swapped for the wear leveling operation, by searching the first queue and the memory element in response to a signal received from the processing block and indicating that the first queue was updated, and storing information on the checked pages in the second queue.

17. The operating method of claim 16, further comprising:
generating, by the processing block, the signal indicating that the first queue was updated; and
performing at least one of a read operation and a write operation on the memory device and a swap operation based on the search result of the second queue.

18. The operating method of claim 17, wherein the performing of the at least one of the read operation and the write operation comprises holding the at least one of the read operation and the write operation when the swap operation is performed.

19. The operating method of claim 18, wherein the performing of the at least one of the read operation and the write operation comprises performing the swap operation at a predetermined point of time after the information on the checked pages is stored in the second queue.

* * * * *